May 7, 1929.  W. J. BURNETT  1,711,631
MULTIPLE COOKER
Filed June 29, 1928    2 Sheets-Sheet 1

INVENTOR.
WILLIAM J. BRUNETT.
BY HIS ATTORNEYS

May 7, 1929.  W. J. BURNETT  1,711,631
MULTIPLE COOKER
Filed June 29, 1928  2 Sheets-Sheet 2
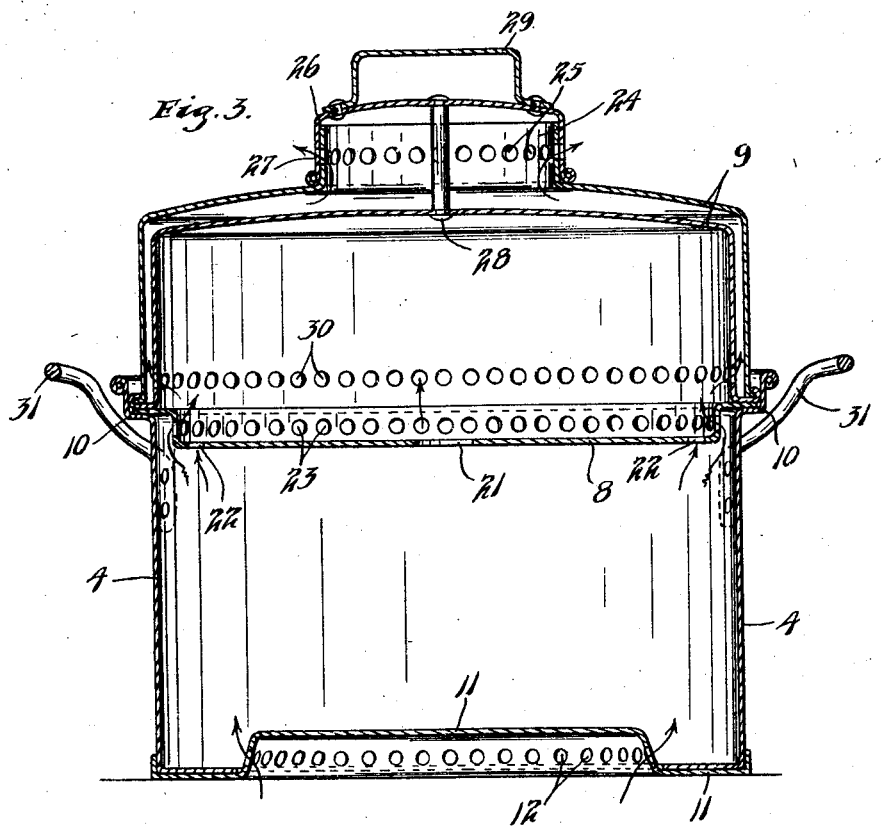
INVENTOR.
WILLIAM J. BRUNETT.
BY HIS ATTORNEYS.

Patented May 7, 1929.

1,711,631

UNITED STATES PATENT OFFICE.

WILLIAM J. BURNETT, OF MINNEAPOLIS, MINNESOTA.

MULTIPLE COOKER.

Application filed June 29, 1928. Serial No. 289,222.

It is the object of this invention to provide a novel and improved mutiple cooker which is of cheap and simple construction, and is capable of a plurality of uses for cooking different types of food and wherein a number of different articles of food can be efficiently cooked at the same time, by utilization of only the heat required for cooking one of the articles of food.

Figure 2:
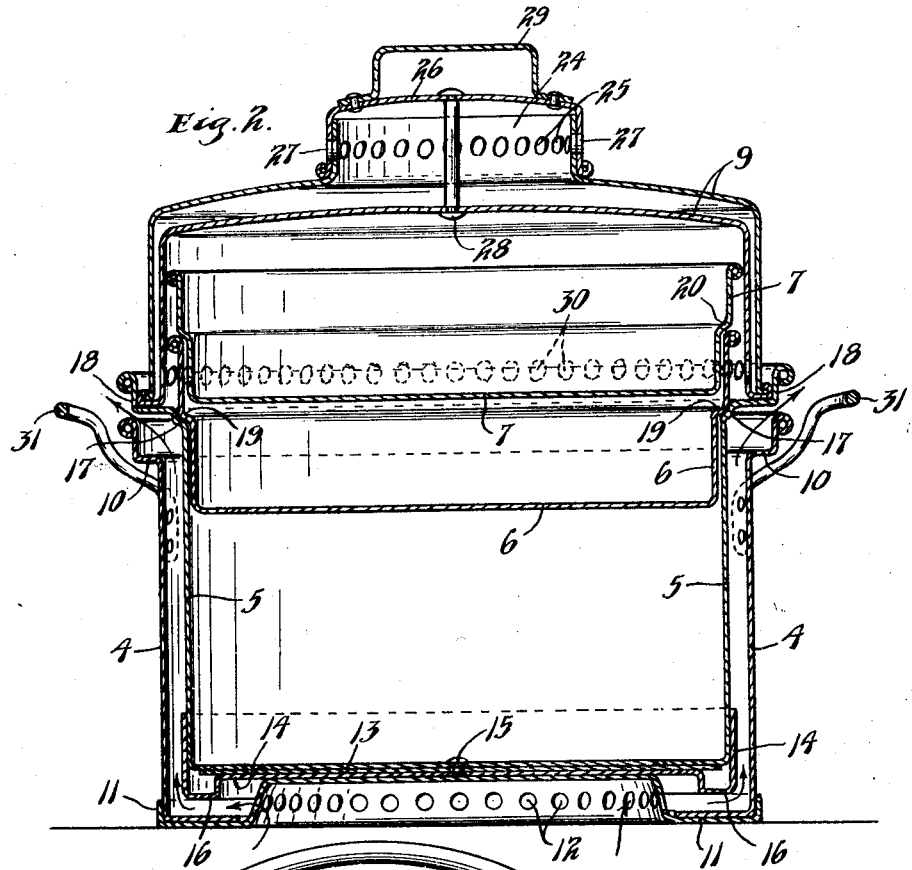
Figure 1:
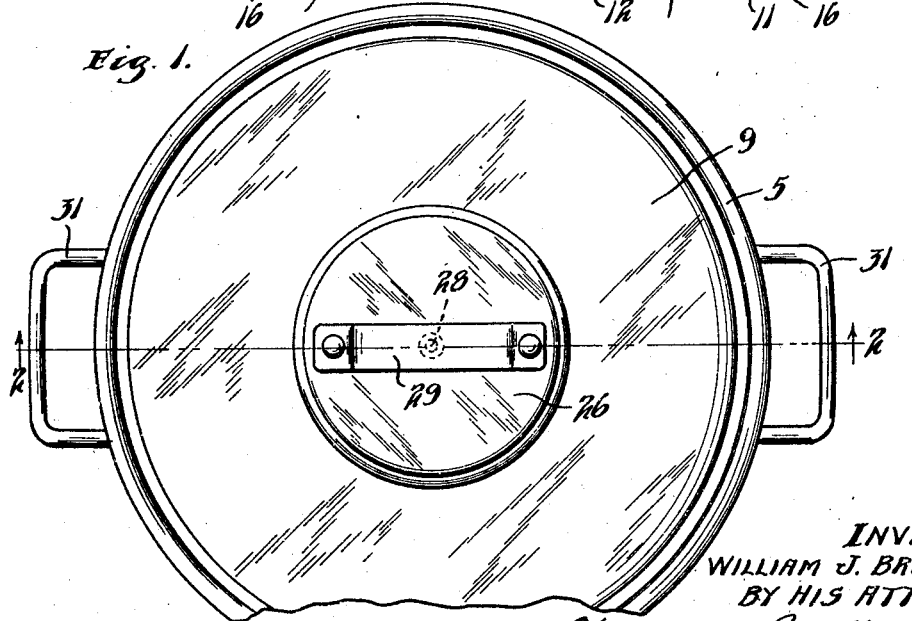

To this end, the invention consists in the novel parts and novel combinations of parts hereinafter defined in the claims and described in the following specification, made in connection with the accompanying drawings, wherein like reference characters refer to the same, or similar parts throughout the various views and, in which, Fig. 1 is a plan view of the cooker;

Fig. 2 is a vertical section taken on the line 2—2 of Fig. 1, as is indicated by the arrows, and showing the parts of the cooker in one assembled position for use; and Fig. 3 is a view similar to Fig. 2, but illustrating the cooker with a different assembly for use in a different manner.

Referring to the drawings the cooker, in general, consists of an outer vessel 4, an inner cooking vessel 5, a first dish-shaped upper cooking vessel 6, a second dish shaped upper cooking vessel 7, a pan-shaped upper cooking vessel 8, and a cover 9. All of the vessels and the cover 9 are of circular form. The outer vessel 4 has a bottom with a large central opening therein and is open topped. The side walls of the outer vessel 4 project straight upwardly from its bottom for a considerable distance and are then outwardly stepped to form an annular seat 10, whereupon the walls again project straight upwardly and are turned outwardly at their upper edges to form a bead. A plate 11 is fitted over the bottom of the outer vessel 4 and is provided with a vertical flange which extends upwardly for a short distance along the sides of the outer vessel 4. The central portion of the plate 11 is upwardly pressed to fit within the opening at the bottom of the vessel 4 and to project for a short distance above the said bottom. The central portion of the plate 11 projects first diagonally upwardly from the bottom of the vessel 4 and then extends horizontally. A plurality of spaced holes 12 are formed in the diagonally upwardly extending portions of the plate 11. The inner cooking vessel 5 is provided with a solid bottom, and the horizontal diameter of the vessel 5 is considerably less than the horizontal diameter of the outer vessel 4. Below the bottom of the inner cooking vessel 5, and bearing against the same is a plate 13 and below the plate 13 is a second plate 14. A rivet 15 may be used for securing the bottom of the inner cooking vessel 5 and the two plates 13 and 14 together. The plate 14 extends from its center outwardly to adjacent the side walls of the vessel 5, whereupon the plate is first downwardly bent, then outwardly bent and then upwardly bent to project some little distance above the bottom of the vessel 5 adjacent the sides thereof. The plate 13 will thus form a flange 16 which projects downwardly from the bottom of inner vessel 5 adjacent the periphery thereof. The radius from the center of the inner cooking vessel 5 to the inner edge of the flange 16 will be considerably greater than the radius from the center of the outer cooking vessel 4 to the inner edge of the bottom of the outer cooking vessel, and the distance that the flange 16 projects downwardly from the bottom of the inner vessel 5 will be considerably less than the distance that the upwardly pressed portion of the plate 11 projects upwardly from the bottom of the outer vessel 4. Accordingly, when the inner cooking vessel 5 is nested within the outer cooking vessel 4, as is illustrated in Fig. 2, the inner cooking vessel will rest on the upwardly extending portion of the plate 11, the flange 16 will be spaced outwardly from the upwardly pressed portion of the plate 11 and the bottom of the flange 16 will also be spaced from the bottom of the outer cooking vessel 4. Considering the inner cooking vessel 5 to be nested within the outer vessel 4, the walls of the inner vessel will extend straight upwardly to a point about level with the top edge of the outer vessel 4; to maintain a spaced relationship between the walls of the inner and outer vessels. At a point about level with the top of the outer vessel 4, the walls of the inner vessel 5 will be outwardly offset in stepped relation to form an inner seat 17. Above the seat 17, the walls of the vessel 5 will extend horizontally outwardly for a considerable distance and will then be upwardly bent to form a second step and an outer seat 18. The upper edge of the inner cooking vessel 5 will be turned over to form a bead. The diameter of the inner cooking vessel 5 at the step 18 is the same as the diameter of the outer cooking vessel at the step 10, and it will be seen that when the two vessels are in nested relation that an air passage will be provided between the upper edge of the outer vessel 4 and the lower edge of the outer step portion 18 of the inner cooking vessel 5.

The first upper dish-shaped cooking vessel 6 has a solid bottom and is open topped and its walls are outwardly offset above the center thereof, to form an annular shoulder 19 adapted to snugly and tightly fit within the inner seat 17 of the inner cooking vessel 5. The second dish-shaped upper cooking vessel 7 is similarly constructed to the first upper cooking vessel 6, with the exception that it is of shorter length. Its walls are outwardly offset above its vertical center to form a shoulder 20 which is adapted to snugly and tightly fit against the upper edge of the first dish-shaped upper vessel 6, which is beaded.

The pan-shaped upper cooking vessel 8 is provided with a bottom having a large center hole 21 therein adapted to be used for lifting the vessel and a series of holes 22 adjacent its periphery. The walls of the vessel 8 extend upwardly for a short distance and are provided with a series of spaced holes 23, and the walls at their upper portions are bent outwardly to form a horizontal flange which is adapted to snugly and tightly fit within the seat 10 of the outer vessel 4, as is illustrated in Fig. 3.

The cover 9 is of doubled wall construction, the two walls being set in spaced relationship to form an air passage. The outer wall is provided with a short outwardly projecting flange at its lower edge, and the inner wall is provided with an outwardly projecting flange at its lower edge which extends outwardly beyond the flange at the lower edge of the outer wall, and is bent thereover to form a beaded lower edge for the cover which is adapted to snugly and tightly fit within either the seat 18 of the inner vessel 5, as is illustrated in Fig. 2, or the seat 10 of the outer vessel 4 above the pan-shaped upper cooking vessel 8, as is illustrated in Fig. 3. The two walls of the cover 9 project upwardly for a considerable distance and are then bent inwardly, the inner wall being closed at its upper end. The upper wall is bent inwardly for some little distance and is then bent upwardly to form an upwardly projecting flange 24 at the top of the cover which is provided with a series of spaced holes 25. A cap 26 fits over the flange 24 and is provided with a lower beaded edge which snugly engages the shoulder formed between the flange 24 and the inwardly extending portion of the outer wall of the cover. The cap 26 has a plurality of spaced holes 27 in its sides and these holes are adapted to be thrown in and out of register with the holes 25 in the flange 24 by rotation of the cap respective to the flange 24. A stud 28 carrying a spacing collar and mounted at one end in the central portion of the inner walls of the cover 9, and at its other end in the central portion of the cap 26, forms a pivot about which the cap 26 may be rotated. A handle 29 secured to the top of the cap 26 is provided for conveniently manipulating the cap. The inner wall of the cover 9 adjacent its lower edge has a plurality of spaced holes 30 formed therein which will admit air to the passage between the two walls of the cover. Suitable handles 31 are secured to the outer sides of the walls of the outer vessel 4.

The cooker is capable of being used in a plurality of different manners in cooking a meal. If, for instance, a roast is to be cooked, the outer vessel 4 with the other vessels and cover removed, will be placed over a stove or other heating element. The roast may then be placed within the outer vessel 4, whereupon the products of combustion from the stove will be admitted through the openings 12 to the outer vessel to sear the roast. When the roast is completely seared, it may be removed from the outer vessel 4, whereupon the inner cooking vessel 5 may be placed within the outer vessel 4 to rest therein, and the roast will be placed within the inner cooking vessel. The cover 9 may then be placed over the inner cooking vessel 5, so that its lower edge seats within the seat 18. The joint formed between the cover 9 and the seat 18 will be very tight so that any steam formed during the cooking operation will be retained within the space enclosed by the inner vessel 5 and the cover 9. The products of combustion from the stove will, as before, be admitted into the outer cooking vessel through the openings 12 in plate 11, whereupon the products of combustion will first circulate upwardly against the plate 14 to heat the bottom of the inner cooking vessel 5. The products of combustion will then circulate downwardly and outwardly around the flange 16, as is indicated by the arrows, Fig. 2, and will then rise upwardly between the walls of the inner and outer vessels, to thoroughly heat the inner vessel and will then pass outwardly through the opening between the upper edge of the outer vessel 4 and the step 18 of the inner vessel 5. If it is found that the roast is cooking too fast, and it becomes desirable to permit certain of the heat within the inner vessel 5 and cover 9 to escape, the cap 26 may be rotated from a position where the openings 27 are out of alinement with the openings 25 to a position where the openings 27 are in partial or total alinement with the openings 25. The heat of the inner vessel can thus be conveniently and easily regulated, and the heat from the fire will be most efficiently used, inasmuch as due to the long circuitous circulation of the products of combustion first upwardly adjacent the bottom of the inner vessel, and then downwardly around the flange 16 and again upwardly between the walls of the inner and outer vessels, the walls of the inner vessel 5 will be in intimate contact with the heated products of combustion, and will absorb a great quantity of heat therefrom. The downwardly projecting flange 16 is particularly important and effective in securing the maximum heating efficiency, inasmuch as the flange will act to hold the hottest products of combustion admitted to outer vessel 4 centrally therein adjacent the bottom of the inner vessel 5. The two plates 13 and 14 will provide a heavy construction at the bottom of the inner cooking vessel 5 to prevent the same from burning out and will yet permit the walls and bottom of the inner vessel to be made of comparatively light gauge material, such as thin aluminium. Also the plates 13 and 14 will heat up intensely and will maintain the temperature at the bottom of the vessel 5 practically constant irrespective of fluctuations in the fire temperature.

After the roast has been cooking for sometime, if it is desired to cook vegetables, or other food, the cover 9 may be lifted, whereupon one of the upper cooking vessels 6 or 7 containing the vegetables may be inserted within the inner vessel 5, so that the shoulder 19 or 20 of the upper vessel will tightly and closely engage the seat 17. If it is desired to cook two vegetables, one vegetable may be placed in the first upper vessel 6 and the other vegetable placed in the second upper vessel 7 and the two vessels may be nested together in the manner shown in Fig. 2 and inserted to rest on the seat 17. When one of the vessels such as the vessel 6 is thus used, the space between the bottom of the upper vessel 6 and the inner vessel 5 will be partitioned off from the space between the cover 9 and the bottom of the vessel 6. As the shoulder 19 of the vessel 6 snugly fits within the seat 17, a tight joint will be formed to hold the heated air or steam within the inner vessel 5. The weight of the food in the upper vessel 6 will assist in tightening the joint between the shoulder 19 and the seat 17, thereby acting to hold the air or steam in the vessel 5 under a higher pressure than would be the case if no weight were placed in the upper vessel 6. When the upper vessel 6 and the cover 9 are both used and the damper at the top of the cover is closed, the pressure in the inner vessel 5 may be maintained at a still higher point, due to the fact that the cover 9 will act to retain the hot air and steam between the upper vessel 6 and the cover 9 at quite a high point and, therefore, the tendency for steam or hot air from the vessel 5 to escape above the vessel 5 will not be great, due to the fact that the difference in pressure between the air and steam above and below the upper vessel 6 will not be great. Similarly, by nesting the second upper vessel 7 above the first upper vessel 6, a still higher pressure may be obtained in the inner vessel 5 due to the fact that the weight of the second upper vessel 7, together with the food carried therein, will cause the shoulder 19 to make a tighter joint with the seat 17. The food within the inner vessel 5 can, therefore, be cooked over high steam pressure and this steam pressure may be varied considerably as desired.

When it is desired to use the cooker as a bake oven, merely the outer vessel 4, upper pan-shaped vessel 8 and cover 9 will be used, and these parts will be assembled together in the manner illustrated in Fig. 3. Potatoes or similar food to be baked may be supported on the upper pan-shaped vessel 8 and the temperature of the bake oven can be regulated by a regulation of the damper at the top of the cover.

It will be seen that by use of the multiple cooker, practically any type of cooking can be done and practically all foods can be cooked. The heat utilized for cooking one type of food can be also utilized in cooking a second type of food at the same time. The construction of the device is simple. All the main parts can be spun from light gauge aluminium, or similar metal and yet the parts will be protected so that they will not burn out.

It will, of course, be understood that various changes may be made in the form, details, arrangement and proportions of the various parts without departing from the scope of the present invention.

What is claimed is:

1. A multiple cooker comprising an outer open topped vessel provided with a central upwardly pressed portion at its bottom with a series of openings therein, an inner open topped cooking vessel having a peripheral flange projecting downwardly from the bottom thereof, said inner cooking vessel being adapted to nest within said outer cooking vessel with the central portion of its bottom inwardly from said peripheral flange resting upon the upwardly pressed portion of said outer vessel, said inner cooking vessel being of such height as to project slightly above said outer cooking vessel to provide an opening adjacent the upper edges of the two vessels for the escape of products of combustion, whereby when said cooker is placed over a heating element the products of combustion will run upwardly through the openings in the upwardly pressed portion at the bottom of the outer vessel to adjacent the inner portion of the bottom of the inner cooking vessel and then will pass downwardly around the downwardly extending peripheral flange of the outer vessel and upwardly between the two side walls of the two vessels to the opening between the upper portions of the two vessels.

2. A multiple cooker comprising, an open topped outer cooking vessel having an outwardly extending flanged seat adjacent its upper edge and having a plurality of openings adjacent its bottom for the admission of products of combustion to its interior, a pan-shaped inner vessel having an outwardly projecting flange adapted to seat on the flanged seat of said outer vessel and provided with a plurality of openings for the passage of the products of combustion above the same; a cover having spaced double walls and provided with a lower edge connecting the walls and adapted to seat tightly against the outwardly projecting flange of said pan-shaped vessel in the seat of said outer vessel, said cover having a plurality of openings adjacent its lower edge through its inner wall for the admission of the products of combustion between the two walls, and a damper at the top of said cover for controlling the exhaust of the products of combustion from between the two walls of said cover.

3. The structure defined in claim 2, said damper comprising a cap fitting over the upper portion of said cover and pivoted for rotation thereon, said cap having a plurality of spaced openings therein, the outer wall of said cover adjacent its upper end having a plurality of spaced openings therein with which the openings in said cap are adapted to be thrown in or out of register by rotation of said cap.

4. A multiple cooker comprising an outer open topped cooking vessel, an inner open topped cooking vessel having two flanged seats adjacent its upper edge in stepped relationship, said inner cooking vessel adapted to nest within said outer cooking vessel, so that portions of the bottom and side walls of the inner cooking vessel will be in spaced arrangement relative to the bottom and side walls of the outer cooking vessel, said outer cooking vessel having a plurality of openings adjacent its bottom for the admission of the products of combustion to pass upwardly between the bottom walls and side walls of the two vessels, a dish-shaped upper cooking vessel having its side walls outwardly offset adjacent its upper end, the offset portions tightly seating within the inner flanged seat on the inner cooking vessel and a cover adapted to fit over said inner cooking vessel and said upper cooking vessel and having a lower edge adapted to tightly engage the outer seat of said inner vessel, said upper cooking vessel being adapted to cooperate with the inner seat of the inner cooking vessel to maintain steam under considerable pressure within the inner cooking vessel when the cooker is in use, and the lower edge of said cover being adapted to cooperate with the outer seat of said inner cooking vessel to maintain steam under considerable pressure within the space defined below the cover and above the upper cooking vessel.

5. The structure defined in claim 4, and a second upper cooking vessel having its walls outwardly offset adjacent its upper end to tightly engage the upper edge of the first mentioned cooking vessel, to maintain steam under considerable pressure between the two upper cooking vessels.

In testimony whereof I affix my signature.

WILLIAM J. BURNETT.